Oct. 7, 1930.   O. J. KENYON   1,777,495
PACKING BOX OF REFRIGERATING APPARATUS
Filed Oct. 1, 1928
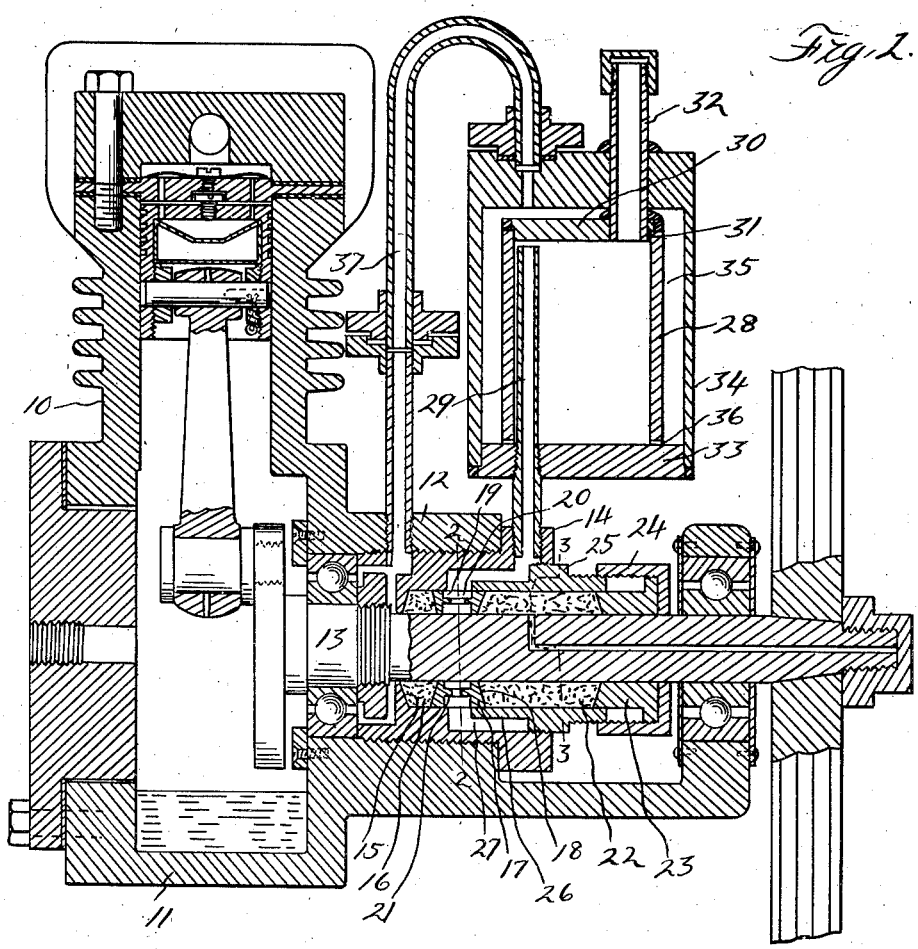
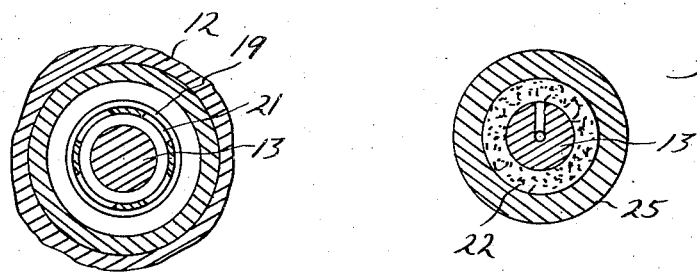
Inventor
Oades J. Kenyon
By Whittemore Hulbert
Whittemore & Belknap
Attorneys Patented Oct. 7, 1930

1,777,495

UNITED STATES PATENT OFFICE

OADES J. KENYON, OF SANTA BARBARA, CALIFORNIA, ASSIGNOR TO INSTANT ICE CORPORATION, OF SANTA BARBARA, CALIFORNIA, A CORPORATION OF DELAWARE

PACKING BOX OF REFRIGERATING APPARATUS

Application filed October 1, 1928. Serial No. 309,426.

This invention relates generally to stuffing or packing boxes and refers more particularly to a packing box designed for use in connection with an ammonia compressor of a refrigerating apparatus.

One of the primary objects of the present invention is to provide a packing box or liquid seal construction of the type described wherein the entire seal is positioned substantially above the normal level of the lubricant in the crank casing forming a part of the compressor so that a sealing liquid other than the ordinary crank case oil may be used to effect the desired results without danger of the same being displaced by the lubricant within the crank case.

Another object of the present invention is to provide means whereby the sealing liquid is prevented from mixing or intermingling with the refrigerating medium so that the sealing liquid is prevented from boiling and liberating gas within the sealing chamber.

A further object of this invention is to provide means whereby the pressure in the sealing chamber is maintained substantially equal to the pressure in the crank case thereby insuring a tight seal about the crank shaft and consequently preventing the escape of refrigerant along this shaft.

Other objects and advantages of the present invention reside in the peculiar construction and arrangement of parts which will be made more apparent as this description proceeds especially when considered in connection with the accompanying drawings wherein:

Figure 1 is a sectional view partly in elevation of a compressor with my improved seal construction applied thereto;

Figure 2 is a sectional view taken on the plane indicated by the line 2—2 of Figure 1; and Figure 3 is a sectional view taken on the plane indicated by the line 3—3 of Figure 1.

Referring now to the drawings, 10 is a compressor unit having a crank casing 11 provided with an extension 12 within which the crank shaft 13 is journalled. Threadedly secured within the extension 12 is a tubular member 14 recessed as at 15 for receiving a suitable packing 16. Arranged adjacent to the packing 16 and engageable therewith is a sliding gland 17 having oppositely inclined walls 18 and having a centrally arranged annular recess 19 cooperating with the shaft 13 to form a chamber 20, the inner walls of the chamber being connected together by means of a ported web 21. Surrounding the shaft 13 upon the opposite side of the gland 17 and engageable therewith is a second packing ring 22 held in the position illustrated in Figure 1 by means of packing gland 23 adjustably mounted upon the shaft 13 by means of a cap 24 threadedly engaging a bushing 25. The latter has a portion intermediate the ends thereof threadedly engaging within the outer end of the tubular member 14, and has another portion 26 of smaller diameter than the portion aforesaid and cooperating with the inner surface of the tubular member 14 to form an annular recess 27 communicating with the chamber 20. The bushing 25 preferably bridges the space between the glands 18 and 23 and the inner surface thereof cooperates with the shaft to form a chamber for the packing 22.

The annular recess 27 and consequently the chamber 20 communicates with a suitable reservoir 28 by means of a passage 29 extending upwardly from the recess 27 to a point adjacent the top of the reservoir. The latter is adapted to contain a heavy oil or similar substance and is closed at the top by means of a cap 30 apertured as at 31 to receive a filler tube 32. The lower end of the reservoir is preferably secured to the cap 33 forming a closure for a container 34. The side walls of the latter are spaced from the walls of the reservoir forming an annular chamber 35 adapted to contain a fluid, preferably a heavy fluid such for example as mercury. Communication between the chamber 35 and interior of the reservoir is accomplished by means of a series of restricted ports 36 formed in the side walls of the reservoir adjacent the lower end of the latter.

As shown particularly in Figure 1 of the drawing the chamber 35 communicates with the crank casing of the compressor by means of a passage 37 leading from the chamber 35 to crank case 11. In this connection it will also be noted from the above figure that the level of the lubricant oil within the crank case is substantially below the sealing chamber 20, thus rendering it possible to use any suitable sealing liquid other than the usual crank case oil without the danger of the same being displaced by the crank case oil. Moreover owing to the fact that communication is provided between the crank casing 11 and chamber 35 the pressure in these chambers will be equalized at all times and inasmuch as the fluid in the chamber 20 is effected by the pressure upon the substance contained within the chamber 35 owing to the communication between the latter chamber and reservoir 28 the pressure upon the liquid in the sealing chamber 20 will be the same as the pressure in the crank case and accordingly a tight seal is maintained about the crank shaft 13 exteriorly of the casing 11.

From the foregoing description it will be apparent that the sealing liquid is maintained in substantially an inert state and owing to the fact that the reservoir is sealed by means of the liquid in the chamber 35, there is no tendency for the sealing fluid to contact with liquid or gaseous refrigerant in the system. As a consequence there is no tendency for the sealing fluid to boil when the pressure in the sealing chamber is reduced to operating pressures and when considering that a large percentage of the gas that escapes along the shaft through the packing is gas that is liberated during the boiling of the fluid within the sealing chamber, it will be understood that the prevention of boiling is a paramount feature of this invention.

In the event that refrigerant, oil or condensate should enter the chamber 35 through the passage 37 the same would not penetrate or intermingle with the mercury or like substance in this chamber but would merely float on the top of the substance owing to density of the latter and consequently would not effect in the least the efficiency of the seal.

Thus from the foregoing it will be apparent that I have provided a packing box assembly that is exceedingly efficient for use in connection with refrigerating compressors in which ammonia or other refrigerating agents difficult to seal, are used. Moreover the particular assembly set forth is relatively simple in construction and compact in design so that it may readily be used with small refrigerating apparatus of the domestic type.

Although mercury is very efficient when used with the oil to effect the desired results, it is apparent that any other fluid having similar characteristics may be used in combination with any other suitable sealing fluid, and that such changes in construction and arrangement of parts may be resorted to as found desirable as fall within the scope of the appended claims.

What I claim as my invention is:

1. In a packing box seal, the combination with a casing containing a fluid and a movable shaft extending through one wall of the casing, of a seal for the shaft preventing the fluid in the casing from escaping along the shaft, said seal including; a chamber surrounding the shaft exteriorly of the casing, a sealed container spaced from the shaft, a sealed reservoir containing a sealing fluid and arranged within the container cooperating with the walls of the latter to form an annular chamber, said annular chamber containing a supply of liquid and communicating with the casing and with the reservoir adjacent the bottom thereof for maintaining a pressure in the latter substantially equal to the pressure in the casing, and a conduit having one end communicating with the first mentioned chamber and the opposite end extending into the reservoir and terminating at a point adjacent the top thereof for supplying sealing fluid to the first mentioned chamber.

2. In a packing box seal, the combination with a casing containing a supply of lubricant and a rotatable shaft journaled in one wall of the casing at a point substantially above the normal level of the lubricant, of a seal for the shaft preventing the escape of the fluid out of the casing, said seal including a chamber surrounding the shaft exteriorly of the casing, a sealed container spaced from the shaft, a sealed reservoir containing a sealing fluid arranged within the container and cooperating with the walls of the latter to form an annular chamber, said annular chamber containing a supply of fluid and communicating with the casing and with the reservoir adjacent the bottom thereof by means of a plurality of circumferentially spaced openings for maintaining a pressure in the reservoir substantially equal to the pressure in the casing, and means establishing communication between the reservoir and first mentioned chamber for supplying sealing fluid to the latter.

3. In a packing box seal, the combination with a casing containing a fluid, and a movable shaft extending through one wall of the casing, of an extension on said wall receiving said shaft, and means for preventing the escape of the fluid in the casing along the shaft, including a tubular member within said extension and surrounding said shaft, a packing in said tubular member, glands within said tubular member at opposite ends of said packing, one of said glands being slidable and having a recess therein cooperating with the shaft to form a chamber, a bushing bridging the space between said glands and having a passage therein registering with the chamber aforesaid, a container above the shaft, a reservoir within the container but spaced from the side walls thereof so that an annular chamber is provided therebetween, said annular chamber containing mercury, said reservoir containing heavy oil and having a restricted passage at the bottom thereof communicating with the annular chamber containing mercury, a tube extending from the passage in said bushing and rising within said container, and means establishing communication between said container and casing aforesaid.

In testimony whereof I affix my signature.

OADES J. KENYON.